Patented Oct. 7, 1941

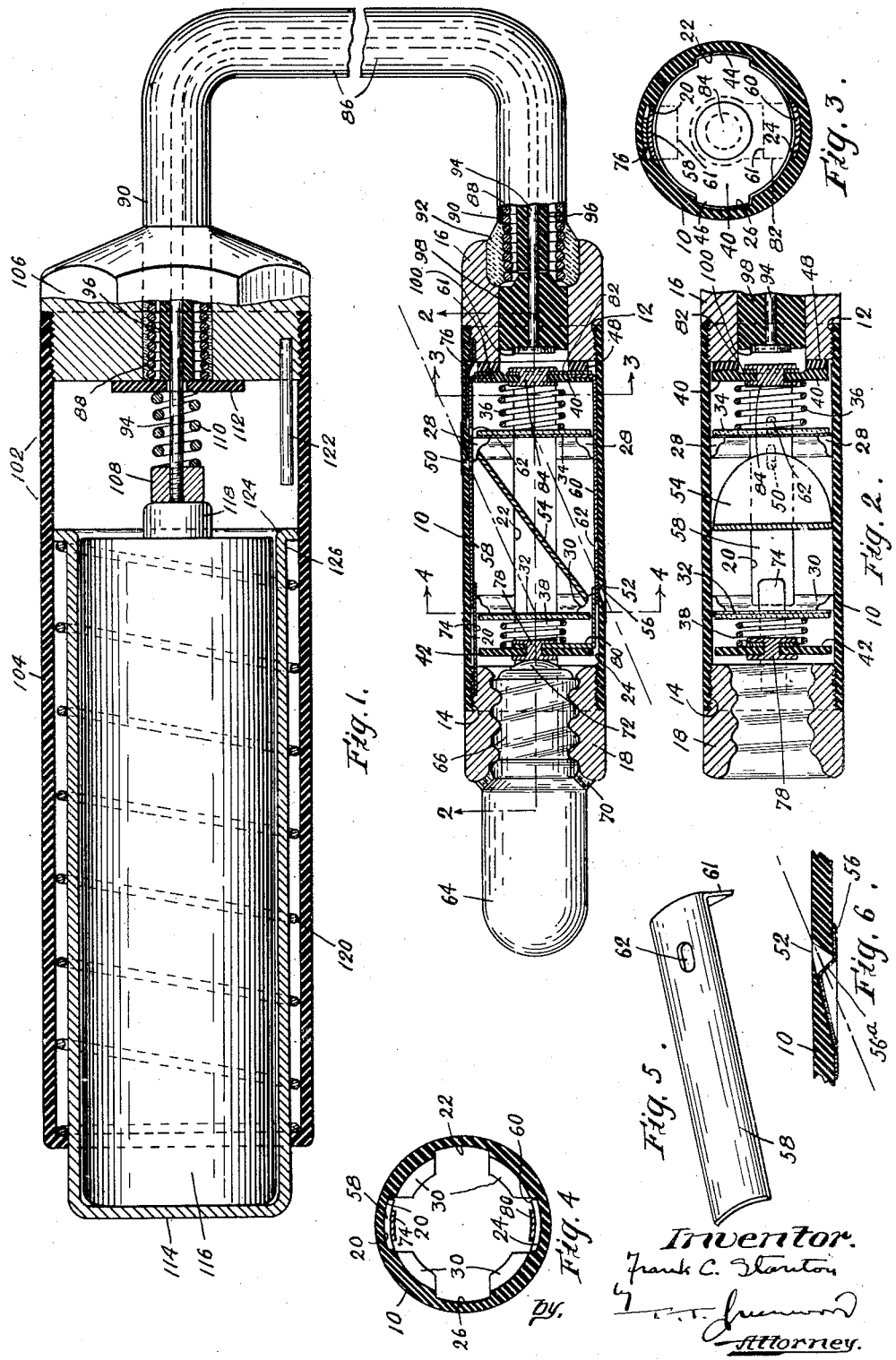

2,258,304

UNITED STATES PATENT OFFICE 2,258,304

CAVITY CAMERA

Frank C. Stanton, Brookline, Mass.

Application March 22, 1939, Serial No. 263,389

17 Claims. (Cl. 95—11)

This invention relates to a camera particularly adapted for photographing the walls of internal cavities of the human body as, for instance, the stomach cavity.

One of the primary requisites of a cavity camera is a simple compact integral structure having provision for brightly illuminating the cavity wall so that a free exposure of the light-sensitive photographic medium may be quickly given. Prior cavity cameras have been proposed employing an incandescent lamp, the brightness of which is insufficient for short exposures of a small fraction of a second. It has also been proposed to obtain a sufficiently bright illumination by exploding a fusible wire. This requires a heavy current, available only by connecting the apparatus to a separate power source as a transformer or storage battery. The camera thus is not a unitary piece of apparatus and its use is restricted to the availability of the illuminating current. Furthermore, repeated explosions of successive fusible wires in its transparent enclosure, cause the formation of light-obstructing metal deposits upon the transparent wall of the enclosure necessitating cleaning or replacement of the enclosure.

Hence an object of the present invention is the provision of a cavity camera the light source of which avoids the above-enumerated objections.

Specifically an object of the present invention is the provision of a cavity camera wherein the light source is an electric bulb of the so-called "photo-flash" type having a small filament in an atmosphere combustible therewith containing, preferably, also combustible material of high actinic value, as magnesium or aluminium foil or the equivalent. Such a light source is adapted to be renewed for each exposure so that the transparent enclosure is always clear. It also requires but small current which, in accordance with the present invention, and as an object thereof, is supplied by a dry cell or battery contained in the operating handle or bulb of the camera, thereby making the camera and its illuminating power source integral.

A cavity camera necessarily gives a small picture and in the cameras heretofore proposed the picture area is about one-sixteenth of an inch in diameter. It is an object of the present invention to provide a cavity camera with the parts so constructed and arranged that a much larger picture can be obtained, for instance, a diameter of approximately one-fourth of an inch. It is apparent that a large areaed picture can contain more understandable detail than a small picture.

A further object of the invention is in a camera structure having a control device or push button structure that effects both the opening of the camera shutters and the illumination of the cavity walls.

In the use of the camera of the present invention it is preferred to fill the cavity, especially the stomach, with water to support the stomach lining in most nearly its normal position and to take a picture of the stomach or other cavity with the camera submerged in the water. By having the camera submerged in water while the interior of the camera contains air, a wider angle of the cavity wall can be included in the effective film area than if the cavity contained air by reason of the bending of the lighting rays when passing between media of different densities.

The usual stomach camera has a lens in the form of a small opening or pin hole. It is an object of the present invention to cover the opening with a very thin transparent film so as to exclude water passing into the camera when the camera is submerged and also to prevent drops of water from being lodged in the pin holes thereby, in effect, to mask the hole as might happen and prevent the making of a successful exposure when the camera is used in a dry cavity.

A further object is generally to improve the construction and operation of cavity cameras.

Fig. 1 is a sectional view through the component parts of the camera structure of the present invention, the view being greatly enlarged.

Fig. 2 is a sectional detail through the camera taken along line 2—2 of Fig. 1.

Fig. 3 is a transverse section taken along line 3—3 of Fig. 1.

Fig. 4 is a transverse section taken along line 4—4 of Fig. 1.

Fig. 5 is a perspective detail of a shutter element.

Fig. 6 is an enlarged sectional view through the camera wall and a lens opening or pin hole thereof.

The camera of the present invention comprises a camera tube or casing 10 of electrically insulating material, as an artificial resin, having enlarged bores at its ends formed with internal screw threads 12 and 14, respectively, in which are screw-threaded upper and lower metal heads or end closures 16 and 18, respectively.

The interior face of the casing is provided with four equi-angularly disposed longitudinal slots 20, 22, 24, 26 and also with inwardly directed circumferential sets of ledges 28 and 30 on which are removably seated photographic film discs 32 and 34. Said film discs are held removably upon said ledges by light helical springs 36 and 38, the outer ends of which bear against discs 40 and 42 located within the casing 10 and having peripherally outstanding ears or projections 44 and 46 which are located loosely in the longitudinal slots 22 and 26 of the casing and which thereby hold said discs from rotary movement. Said discs 40 and 42 are preferably of suitable insulating material, as fibre or the like. An insulating disc 48 is interposed between the disc 40 and the inner end face of the end plug 16 to electrically insulate electrically conducting parts carried by said discs as will be explained hereinafter.

The casing wall 10 is provided with opposed longitudinally displaced lens openings or "pin" holes 50 and 52 therethrough, each being located near a separate film and inclined at an angle through the casing to direct the light onto the other film. No lens is employed, the small opening being the equivalent of a lens. The openings preferably are tapered, being larger at the outer surface of the casing than at the inner surface since the light rays converge in passing from the liquid outside the casing to the air within the casing. The lens openings are located in the longitudinal line of the grooves 20 and 24 of the casing. A partition wall or diaphragm 54 extends diagonally across the casing between the films and is seated against the opposite ledges 28, 30 to isolate the light chambers of the films from each other and to prevent the light in one film chamber from directly impinging upon the film of the other chamber. It is not essential that the diaphragm have light tight engagement with the wall of the casing.

The lens openings are covered by thin transparent films 56 formed, for instance, by dropping a drop of a dilute solution of collodion or nitrocellulose onto a pool of water. A very thin cellulosic film remains floating on the water when the solvent has been eliminated and may be picked up and applied over the lens opening and cemented in place. Preferably, during the act of applying the film, the film is positioned in the tapered and inclined aperture so that it is approximately perpendicular to the axis of the aperture, as illustrated at 56a, Fig. 6. While a thicker film might under some circumstances be employed, it is preferred to use the thin film herein described as it is so thin that double reflection from its opposite faces is not present.

The passage of light through the apertures is controlled by a pair of shutter members 58 and 60. These shutter members can be identical and one is illustrated in enlarged detail in Fig. 5. Each shutter member comprises an elongated plate arcuate in cross section and conformed in cross section and width to move freely in a slot 20, 24, in which it is located. The shutter members have inwardly reflexed end parts or ears 61 that are imbedded in the peripheral parts of the disc 40 which constitutes a shutter carrying member. The shutters are provided with apertures 62 which are adapted to be moved into registration with the lens openings to allow light to impinge upon and expose the films.

In the normal or unoperated position of the parts the spring 36 maintains the shutter carrying disc 40 yieldingly against the end part of the closure member 16, or the washer 48 thereof, the shutter opening 62 being to the right of the lens openings. By movement of the disc 40 toward the left, or downwardly as viewed from the normal position of the camera in the stomach, the shutter openings are caused to register with the lens openings and thereby expose the films.

The interior of the cavity is illuminated for the purpose of making a film exposure by a source of illumination 64 located at the lower end of the camera. Said source of illumination comprises a bulb of the so-called photo-flash type, containing a filament of small current carrying capacity surrounded by an atmosphere combustible therewith and in contact with material as a metal foil of high actinic value. The bulb is provided with an external screw shell 66 which is screw-threaded removably within the internal screw threads of the end plug 18. The bulb is sealed against passage of liquid into the interior of the casing around the screw shell by a packing washer 70 interposed between and in contact with confronting flange surfaces of the end plug and the bulb. The screw shell of the bulb constitutes one terminal thereof and the bulb is provided with a second or end terminal 72. The end plug 18 is connected electrically with the opposite end plug 16. For this purpose a contact strip 74 is electrically connected with the end plug 18 and projects longitudinally of the casing into electrical engagement with the lower end part of the shutter member 58. The upper part of the shutter member is in electrical engagement with a conducting strip 76 that is electrically connected with the end plug 16. Thus irrespective of movements of the shutter current can pass between the end plugs. The end contact 72 of the bulb bears against a center contact 78 carried by the insulating disc 42. Said center contact 78 is connected with a conducting strip 80 that bears against the lower end part of the other shutter member 60 and is in electrical connection therewith. The upper end of said shutter member is electrically connected through a conducting strip 82 carried by the insulating disc 40 with a center contact 84 of said disc. Thus when a source of current is connected to the center contact member 84 and the upper end plug 18 the bulb 64 is caused to be operated.

Operation of the shutter and the bulb is controlled through a flexible tube structure 86 which supports the camera in the cavity. The flexible tube structure comprises a small diameter tube formed of close convolutions of spring wire 88 encased within a thin flexible protective sheath 90 of suitable material, as rubber. The rubber sheath is removed from one end of the tube to expose the convolutions which are secured to the upper end plug 16 by a mass of solder 92 or the like. A thin flexible push wire 94 is located within the tube and is insulated therefrom by a flexible insulating sheath 96. Said wire is movable slideably within an insulating bushing 98 carried by the end plug 16 and has an enlarged head 100 thereon that confronts and is normally spaced from the center contact 84 of the shutter operating disc 40. It is apparent that longitudinal movement of the wire will effect electrical connection between the wire and the source of illumination and will also move the shutters longitudinally of the casing to expose the films.

Movements of the wire and control of the current to the bulb 64 are effected by an external control device 102. Said device includes a cylindrical enclosing casing 104 which can be of insulating material as herein illustrated or of metal having an internal surface insulation. Said casing at one end is internally screw-threaded and is screw-threaded on a metal head 106 in which the outer end of the flexible tube 86 is electrically and mechanically connected. The flexible push wire 94 extends through said tube into the interior of the casing 104 and at the end thereof is provided with an enlarged head 108. A compression spring 110 encircles said wire and bears against the under face of the head and also against an insulating disc 112 seated against the inner face of the casing head 106. The spring thereby holds the wire yieldingly in an unoperated position with the head 100 against the insulating bushing 98. A metal tubular casing 114 is slidably located within the outer casing 104 and normally has an end projected outwardly beyond the end of the outer casing and contains a battery 116. Said battery can comprise one or more electric dry cells of small diameter such as is in common use in electric flash lights of the fountain pen type. The outer metal casing of the battery is in electrical contact with the enclosing casing 114 while the center contact 118 of the battery bears against the head 108 of the push wire.

The casing 114 is surrounded by a compression spring 120 which urges the casing and the battery therein into contact with the head 108 of the push wire. The spring 110, however, is more powerful than the spring 120 so that the push wire does not yield until pressure is applied to the end of the inner casing. Inward movement of the casing and push button displaces the push wire longitudinally and effects the opening of the shutters as has been explained heretofore.

The head 106 is provided with a projecting contact pin 122 which is adapted to be engaged by the outstanding end flange 124 of the inner or battery casing and complete the circuit through the battery and the bulb 64 thereby to cause the bulb to flash. The disposition of the parts, however, is such that the shutter is open prior to the operation of the bulb. The shutter slot 62 is elongated to insure the opening of the lens aperture prior to the flashing of the bulb. The bulb is to be renewed for each exposure.

I claim:

1. In apparatus for photographing cavities, a casing, a camera in said casing, a shutter therefor, a light source at one end of said casing, a control tube connected with the other end of said casing, a source of electrical power for said light source and a flexible member extended longitudinally within said tube having an operative connection with said shutter and an electrical connection with said power source and said light source.

2. In a cavity camera, an enclosing casing having an internal diagonally disposed diaphragm providing two frusto-cylindrical camera housings, means for supporting photographic surfaces at the bases of said housings and in opposite end parts and crosswise of said casing, and lens openings at the apexes of said housings, directed directly at the bases of said frusto-cylindrical housings, and a light source on the end of said casing.

3. In a cavity camera, a housing having a lens aperture therethrough, said casing having an internally directed ledge on which a film disc is adapted to be supported crosswise of the casing in line with said aperture, a removable end closure for the casing, a disc removable through the end of the casing loosely disposed within said casing bearing on said end closure, spring means interposed between said disc and a film on said film support for holding the film upon said support, an electrical contact carried by said disc, and means arranged for electrical engagement with said contact.

4. In a cavity camera, a housing having a lens aperture therethrough, said casing having an internally directed ledge on which a film disc is adapted to be supported crosswise of the casing in line with said aperture, a removable end closure for the casing, a disc removable through the end of the casing loosely disposed within said casing bearing on said end closure, and spring means interposed between said disc, and a film on said film support for holding the film upon said support, said end closure having a light bulb screw-threaded thereinto, said light bulb having a center contact and said disc having a center contact engaged with said bulb contact, and means for passing electric current through said center contact into said bulb.

5. In a cavity camera, a small diameter enclosing casing having a lens aperture extended diagonally therethrough, film supporting means arranged to support a film crosswise of the casing in line with said aperture, and a shutter controlling said aperture slidable longitudinally of the casing across said aperture.

6. In a cavity camera, an enclosing casing having a lens aperture extended diagonally through the side wall of the casing, film supporting means arranged to support a film crosswise of the casing in line with said aperture, and shutter means controlling said aperture movable longitudinally of the casing, said shutter means including an elongated apertured plate confronting said lens aperture and slidable in a slot extended longitudinally of the casing, spring means for holding said plate with the aforesaid apertures out of alignment, and flexible means for moving said plate lengthwise of the casing to align the apertures.

7. In a cavity camera, an enclosing casing having diametrically opposed longitudinally extended internal slots, lens apertures passing diagonally through the casing wall and opening into said slots, film supports arranged to hold films crosswise of the casing each in line with a separate lens aperture, a shutter structure comprising a supporting disc disposed crosswise of the casing and movable longitudinally thereof, and shutter plates carried by and movable with said disc located in said slots and having apertures therein adapted to be moved into registration with said lens apertures.

8. In a cavity camera, an enclosing casing having diametrically opposed longitudinally extended internal slots, lens apertures passing diagonally through the casing wall and opening into said slots, film supports arranged to hold films crosswise of the casing each in line with a separate lens aperture, a shutter structure comprising a supporting disc disposed crosswise of the casing and movable longitudinally thereof, and shutter plates carried by and movable with said disc located in said slots and having apertures therein adapted to be moved into registration with said lens apertures, spring means acting on said disc in a direction to maintain said lens apertures closed, and flexible means for moving said disc in the opposite direction to open said apertures.

9. In a cavity camera, a casing having a lens aperture therethrough, means for supporting a film in registration with said aperture, a light bulb at the end of said casing, a shutter structure for controlling said lens opening, a flexible electrically conducting supporting tube for said casing having an electrically conducting shutter operating member therein insulated from said tube, and means including said shutter mechanism for electrically connecting said light bulb with said tube and shutter operating member.

10. In a cavity camera, an enclosing casing having a lens opening therethrough, shutter mechanism controlling said opening, a light source at the lower end part of said casing, a casing supporting conducting tube connected with the upper part of said casing having an internal electrically conducting shutter operating member insulated from said tube and means including said shutter mechanism for establishing electrical connection between said light tube and said supporting tube and shutter operating member.

11. In a camera structure, an enclosing casing having conducting end closures, a light source providing a terminal shell and a center contact having its shell screw-threaded into the lower end closure, lens apertures in said casing wall, electrically conducting mutually insulated shutter members each controlling a separate aperture, an operating member for said shutter mechanism, and means including said shutter members for establishing electrical connections from the center contact of said light source and the lower end closure of said casing to said shutter operating member and the upper end closure of said casing.

12. In a cavity camera, a casing having a conducting upper end closure, a flexible conducting supporting tube connected with said end closure having an internal conducting push wire, said casing having lens apertures therethrough, shutter mechanism located within said casing having a pair of mutually insulated conducting plates each controlling a separate lens aperture, an insulating member having a center contact disposed in position to be engaged and moved lengthwise of the casing by said push wire and carrying and insulating said shutter plates, means electrically connecting one of said shutter plates with said center contact, means connecting the other shutter plate with said upper end closure, a conducting lower end closure, means providing electrical connection between said lower end closure and one of said shutter plates, and a light bulb having a screw-threaded terminal shell connected with said lower end closure and having a center contact disposed internally of said casing, an insulating disc located within said casing having a center contact engaged with the center contact of said bulb and having means connecting its center contact electrically with the other shutter plate.

13. In a cavity camera, a casing having a conducting upper end closure, a flexible conducting supporting tube connected with said end closure having an internal conducting push wire, said casing having lens apertures therethrough, shutter mechanism located within said casing having a pair of mutually insulated conducting plates each controlling a separate lens aperture, an insulating member having a center contact disposed in position to be engaged and moved lengthwise of the casing by said push wire and carrying and insulating said shutter plates, means electrically connecting one of said shutter plates with said center contact, means connecting the other shutter plate with said upper end closure, a conducting lower end closure, means providing electrical connection between said lower end closure and one of said shutter plates, and a light bulb having a screw-threaded terminal shell connected with said lower end closure and having a center contact disposed internally of said casing, an insulating disc located within said casing having a center contact engaged with the center contact of said bulb and having means connecting its center contact electrically with the other shutter plate, film supports located within said casing arranged to hold a film each in line with a separate aperture, and a compression spring located between each disc and an adjacent support and adapted to press a film against the corresponding support.

14. In a cavity camera, the combination of a camera casing having a light source, a battery casing, a flexible electrically conducting tube connecting said battery casing and camera casing and having an internal flexible electrically conducting push wire insulated from the tube, means electrically connecting said tube and push wire operatively with said light source, said battery casing adapted to contain a battery and having movable means for operating said push wire longitudinally and also for connecting said battery to said push wire and conducting tube.

15. In a cavity camera, the combination of a camera casing having a light source, a battery casing, a flexible electrically conducting tube connecting said battery casing and camera casing and having an internal flexible electrically conducting push wire, means operatively connecting said light source electrically with said tube and push wire, said battery casing adapted to contain a battery and having movable means for operating said push wire longitudinally and also for connecting said battery to said push wire and conducting tube, said battery casing comprising an outer casing, an inner electrically conducting casing movable lengthwise of said outer casing and adapted to contain a battery with one terminal engaged with said inner casing and another terminal engaged with said push wire, and contact means operated by movements of said inner casing.

16. In a cavity camera, a camera casing having a light source, a lens aperture, a movable shutter controlling said aperture, a conducting flexible tube carrying said casing and having a conducting push wire therein for operating said shutter, said push wire being insulated from said enclosing tube, means operatively connecting said light source electrically with said tube and push wire, and switch means for moving said push wire longitudinally and also for connecting said push wire and enclosing tube with a current source.

17. In a cavity camera apparatus, a camera casing having a shutter and a light bulb, a flexible conducting supporting tube for said camera casing having an internal conducting shutter operating push wire, means connecting the terminals of said light bulb with said push wire and enclosing tube, and means for connecting a current source with said push wire and tube.

FRANK C. STANTON.